P. B. JOHNSON.
TOOL HOLDER.
APPLICATION FILED JULY 19, 1917.
1,303,205.
Patented May 6, 1919.
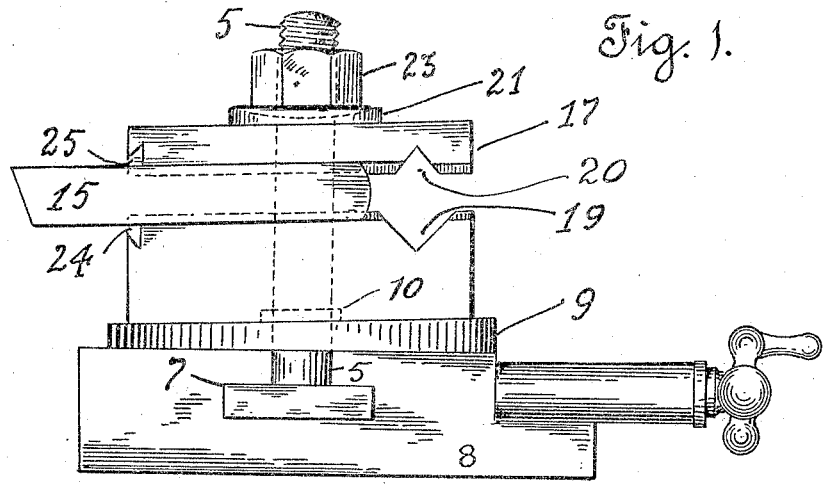
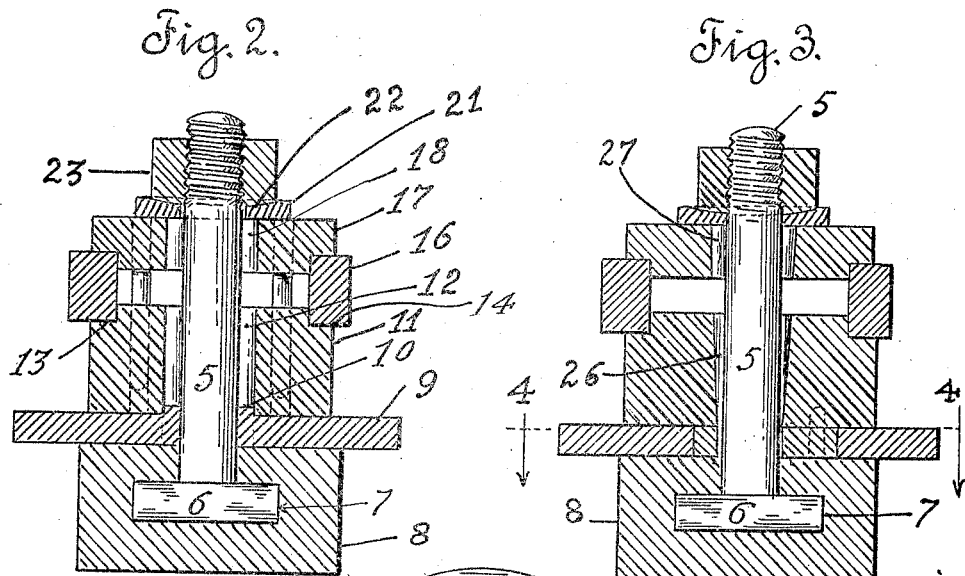
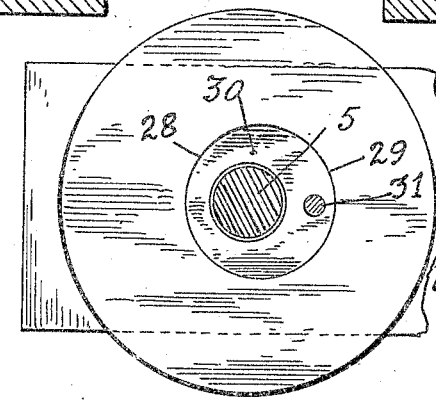

UNITED STATES PATENT OFFICE.

PASCHAL BORDEN JOHNSON, OF LOS ANGELES, CALIFORNIA, ASSIGNOR TO FRANK J. MYERS, OF LOS ANGELES, CALIFORNIA.

TOOL-HOLDER.

1,303,205.  Specification of Letters Patent.  Patented May 6, 1919.

Application filed July 19, 1917. Serial No. 181,532.

*To all whom it may concern:*

Be it known that I, PASCHAL BORDEN JOHNSON, a citizen of the United States, residing at the city of Los Angeles, county of Los Angeles, State of California, have invented new and useful Improvements in Tool-Holders, of which the following is a specification.

My invention relates primarily to a holder for tools carried by the slide rest of a lathe; and the object thereof is to provide a tool holder which will securely hold tools having shanks of different sizes cross sectionally and which can be quickly and easily adjusted to bring the cutting point of different sized tools to the correct position for use.

In the drawings forming a part of this application:

Figure 1— is a side elevation of my improved tool holder in place in the rest, the other parts of the lathe not being shown.

Fig. 2— is a vertical cross-section on the center line of the clamping post which is shown in elevation.

Fig. 3— is a view similar to Fig. 2 of a slightly modified form.

Fig. 4— is a section on the line 4—4 of Fig. 3.

Referring to the drawings 5 is the clamping post of my holder having a head 6 which is mounted for sliding movement in groove 7 of the slide rest 8. On this post is mounted a cam block 9 which is preferably circular and has milled edges and is provided adjacent to post 5 with a small annular ledge 10 on its upper surface. Surrounding post 5 and resting upon block 9 is the base block 11 which in general outline is a parallelepiped. Extending through the center of block 11 is a hole 12 which receives ledge 10 snugly. At the upper edges of block 11 and along the sides thereof the corners are cut out to form L-shaped grooves 13 and 14. In groove 13 is received the cutting tool 15 and in groove 14 is received a spacer bar 16. Surrounding post 5 is clamping plate 17 which has in its lower surface L-shaped grooves disposed above like grooves in block 11 for like purposes. The L-shaped grooves are of such depth that they will receive the smallest tool used when the plate is almost in contact with the block. Plate 17 has a hole 18 therethrough of the same size which registers with the hole in block 11. In the upper surface of block 11 near the end is a V-shaped groove 19 and in the lower surface of plate 17 is a like V-shaped groove 20 which registers with groove 19. In grooves 19 and 20 are received the round shanks of boring tools. Surrounding post 5 and resting upon plate 17 is a washer 21 whose upper surface has a globular shaped depression 22 in which is received the globular shaped lower surface of nut 23 which screws upon the top of post 5 to hold the tools positioned for use. Block 11 and plate 17 have small V-shaped grooves 24 and 25 across the ends to hold a spacer bar when a tool is used in grooves 19 and 20. Said grooves are also used to hold a threading or a cutting-off tool. As shown in Fig. 2 a cutting tool 15 is the largest tool used in the holder and its cutting point is properly positioned by having the thinnest edge of the cam block under the cutting end of the tool. When the tool becomes worn by use its point can be adjusted up by rotating the cam block. It will be observed that a cutting tool with a smaller shank may be used by rotating the cam block to bring a thicker portion under the cutting point thereby enabling the use in the holder of tools having shanks of different sizes, and that when adjusted and clamped by screwing nut 23 down on post 5 the tool is held firmly positioned and cannot rock as can those tools which are supported by base blocks having circular bottoms when great pressure is put on the tool. In Figs. 3 and 4 I have shown a modified form. In this form the base block 11 has an upwardly extending tapered hole 26 and plate 17 has a like tapered hole 27 which registers with hole 26. Cam block 9 has a larger hole 28 therein in which is received a disk 29 which has a hole 30 therein, in which hole is received post 5. Hole 30 is eccentric to the center of the disk. The disk is connected to block 11 by dowel pin 31. In this form ledge 10 is omitted from the cam block.

It will be observed that by this construction one of the ends of grooves 13 and 14 is much closer to post 5 than the other ends thereby permitting the work to be brought closer to or farther away from post 5. This is of advantage as when heavy work is being done it is desirable to bring the cutting end of the tool as close to the post as possible whereby strain on the post is reduced. When light work is being done block 11 can be rotated to bring the cutting end of the tool farther from post 5 which is also an advantage. It will also be observed that I utilize my base block and clamping plate for holding tools having round shanks and square shanks and for threading and cutting off tools by making in the opposed surfaces grooves, some of which cross the others, and have different cross-sectional configuration.

Having described my invention what I claim is:

1. In a lathe tool holder the combination with a slide rest having an upright post adjustably engaged therewith, of a cam block surrounding said post and resting on said rest; a base block resting on said cam block and surrounding said post and provided with grooves in its upper face some of which grooves cross the other grooves, and are of different cross-sectional configuration to those they cross; a clamping plate surrounding said post and provided with grooves in its lower face; and means to clamp a tool between said base block and plate.

2. In a lathe tool holder the combination with a slide rest having an upright post adjustably engaged therewith, of a block and plate having tool holding grooves in their opposed surfaces some of which grooves cross the other grooves, and are of different cross-sectional configuration to those they cross mounted on said post, said block having a hole therein larger than the diameter of the post; a disk mounted on said post within said block and secured to said block, said disk having a hole in which said post is workably received, said hole being eccentric to the center of the disk; a cam block revolubly mounted on said post between said rest and block; and means to clamp said parts.

In witness that I claim the foregoing I have hereunto subscribed my name this 2nd day of July, 1917.

P. BORDEN JOHNSON.

Copies of this patent may be obtained for five cents each, by addressing the "Commissioner of Patents, Washington, D. C."